United States Patent Office 3,036,334
Patented May 29, 1962

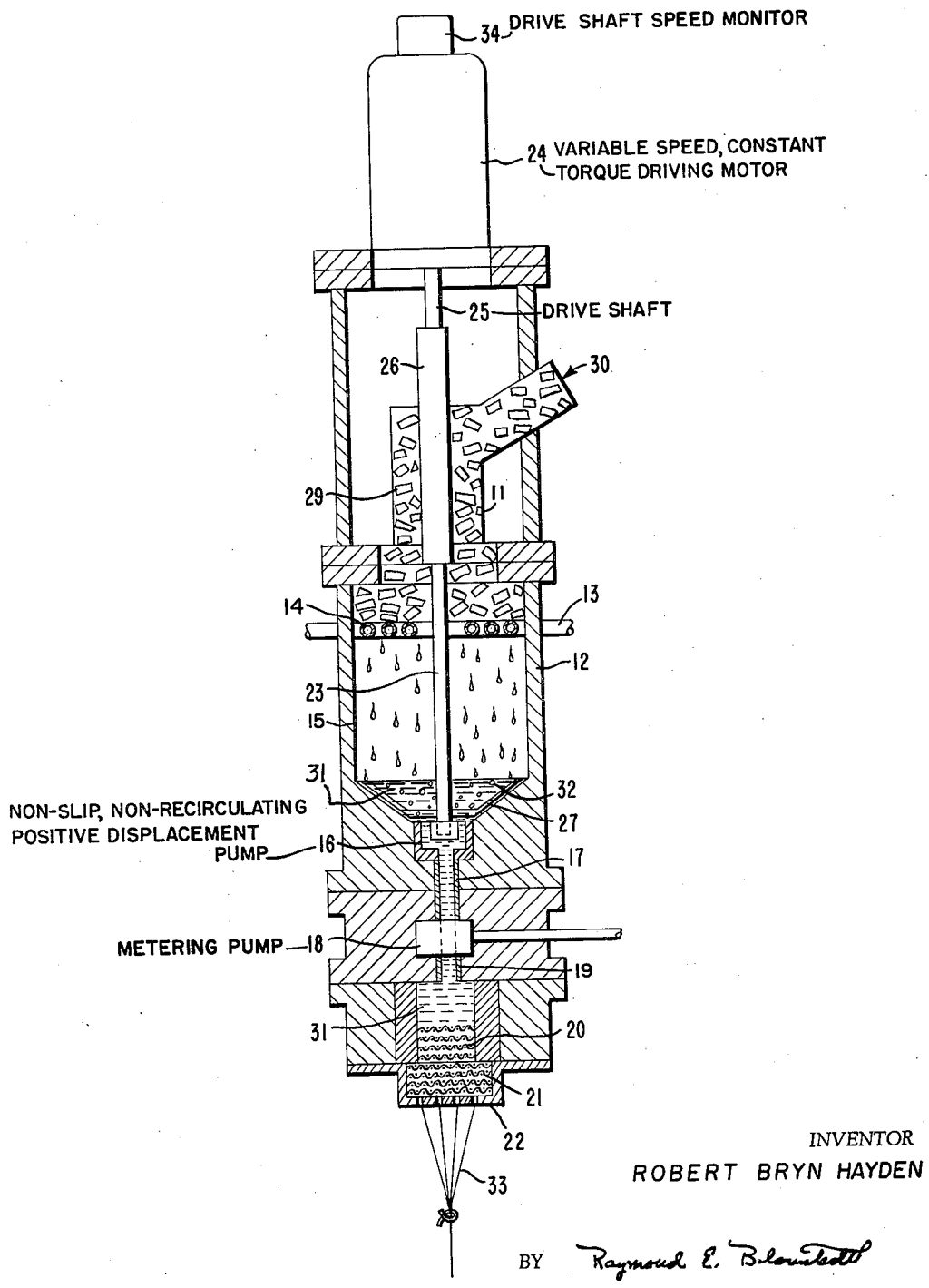

3,036,334
MELT SPINNING MONITORING MEANS
Robert Bryn Hayden, Wilmington, Del., assignor to E. I. du Pont de Nemours and Company, Wilmington, Del., a corporation of Delaware
Filed Mar. 26, 1958, Ser. No. 724,063
2 Claims. (Cl. 18—8)

This invention relates to the extrusion of polymeric materials and has particular reference to an improved apparatus for the production and continuous monitoring of the quality of the articles being so prepared.

During the spinning of polymeric materials into filaments, ribbons, yarn, and the like structures, it is important that an unvarying supply of polymer be furnished to the metering devices customarily employed in such processing. Otherwise, variations in the properties of such structures, e.g., variable denier, or outright spinning discontinuities are likely to be encountered. The problem of maintaining an unvarying supply of polymer becomes most acute when spinning such materials in the molten state, as these high-viscosity materials usually require much higher pressure, as they are applied to the metering device, to insure an adequate supply. In addition, molten polymer usually contains numerous bubbles throughout, caused by decomposition, entrainment, or from moisture in the solid material liberated as steam. The presence of bubbles in the melt requires even higher pressures in order that they remain in solution. Accordingly, this invention is particularly useful in the melt-spinning of polymeric materials, e.g., "fiber-forming" polyamides and polyesters.

U.S. Patent 2,278,875 to Graves describes a process wherein molten polymer from a pool or similar reservoir means is supplied under pressure to a metering device. Given an adequate supply of polymer, this practice results in uniform quantities of bubble-free melt being furnished to the meter pump. However, the supply of polymer is not always an adequate one. "Bridging" may occur in the grid-melting apparatus, foreign material or unmelted polymer flake may block the "booster pump" intake, flake supply means may fail, or the "booster pump" itself may slip or otherwise not function properly. Moreover, a melting grid, after a period of time, gradually loses its capacity to melt, due to gelation. All of these factors affect the level of polymer in the melt pool and, at reduced polymer levels, the number of bubbles in the melt increases. These factors, combined or separately, may lead to insufficient supply or pressure of polymer being furnished to the meter pump, and, therefore, adversely affect the quantity of the articles being produced.

Since many of these supply interruptions are of an intermittent or self-correcting variety, yarns of off-standard quality are not always detected during production and may pass unnoticed to the consumer. There has been a need for a means to detect and eliminate such off-standard yarns to insure that only first quality yarns reach commercial channels.

In prior spinning procedures and equipment such as that of U.S. 2,278,875 to Graves for indicating loss of melt or impending supply failure, a variety of pressure-sensitive devices or level indicators to monitor the spinning process have been used. However, such devices are usually unduly elaborate and/or expensive, or not strictly dependable. Moreover, since such devices necessarily interrupt or impede the normal flow of polymer, gel formation, polymer degradation, or polymer stagnation becomes a serious problem. Recirculatory systems as in the Graves apparatus are undesirable from this standpoint, as is the use of a slipping pump for providing constant flow. Gelled or otherwise inferior polymer causes low and/or variable luster, poor product quality, and appreciably shortens the useful life of a spinning unit. Avoiding or minimizing gelation and stagnation is a problem of magnitude comparable to the polymer supply problem discussed above.

One object of this invention is to provide an apparatus for spinning molten polymeric materals wherein polymer is supplied to a metering device at constant pressure. Another object is an apparatus for spinning polymeric material wherein continuous or intermittent variations in polymer supply and/or pressure may be continuously observed and corrected. A further object is to provide means for spinning synthetic polymer fibers from the molten state at constant torque. Yet another object is to provide means for automatically discontinuing spinning whenever supply of polymer falls below a predetermined level. These and other objects together with a means for accomplishing them will appear hereinafter.

According to this invention a synthetic polymer is spun into fibers by supplying polymer to a spinneret under constant pressure. Failure of the equipment to receive an adequate supply of polymer at any time during spinning is indicated visually, audibly, or by other convenient means, thereby permitting immediate correction to avoid production of off-grade yarns. By means of this invention about 80% or more of off-grade yarns heretofore produced by melt-spinning and due to variable deniers are eliminated while useful life of the spinning equipment is at the same time substantially lengthened.

Constant supply of polymer to the spinning cell is accomplished according to this invention by apparatus comprising a combination of a conventional synthetic polymer melting apparatus modified to contain a positive-displacement pump arranged to supply at constant pressure a metering pump with molten polymer. The positive-displacement pump is driven at constant torque so that the pump shaft will change its rate of rotation to reflect changes in polymer supply to this pump. By continuously monitoring the speed of the pump shaft, the need for corrective action is determined. For example, when the shaft speed exceeds the normal shaft speed by a predetermined amount, an inadequate supply of polymer to the pump or a low viscosity is indicated, whereas a low shaft speed may indicate an excessive viscosity.

The improved spinning apparatus of this invention insures a constant supply of bubble-free polymer to the metering device independent of short-range variations in the upstream supply, substantially eliminates stagnation-inducing polymer recirculation or holdup, and provides an immediate and continuous indication of the condition of the spinning apparatus and the quality of the articles being produced.

In the attached drawing, which illustrates a preferred apparatus of the invention, there is shown schematically and in partial section a melt-spinning apparatus. The apparatus includes hopper 11 for holding a supply of unmelted polymer, melting unit 12 equipped with hollow heating pipes 13 and 14, a reservoir 15 for molten polymer, melt-pool pump 16 communicating through conduit 17 to meter pump 18, which supplies molten polymer at the required rate and pressure through conduit 19 to a conventional spinning pack 20 comprising the usual filtering medium 21 and a spinneret 22. Melt-pool pump 16 is of the positive-displacement variety (no recirculation and slipping) and is driven by shaft 23 and constant torque drive means 24. Shaft 23 is attached to shaft 25 of drive means 24 by connector 26. Attached to shaft 23 is a melt-pool stirrer 27 (described in U.S. 2,683,073 to Pierce). Meter pump 18 is driven through shaft 28 by external means not shown. The apparatus is suitably insulated, sealed, etc., according to accepted practice; suitable means are provided to maintain an inert atmosphere within hopper 11 and melting unit 12.

During spinning, solid polymer, preferably in the form of small flakes 29 is introduced through opening 30 into hopper 11, and drops onto fins 13 and 14, internally heated to provide a surface temperature above the melting point of the polymer, and is thereby melted. The molten polymer 31, often containing undissolved gas bubbles 32 is collected in reservoir 15. Molten polymer is withdrawn from the reservoir (melt pool) 15 by positive-displacement pump 16 and is supplied at constant pressure to metering pump 18 which, in turn, meters the molten polymer to the spinning pack 20 in the usual manner, ultimately resulting in the production of filaments 33. In communication with drive means 24, and particularly, the extension of its shaft 25 is detector 34, which comprises a counter or the like means responsive to the speed (rate of rotation) of shaft 25. Accordingly, detector 34 provides means for continuously monitoring the rate of rotation of shaft 23 and melt-pool pump 16. The detector 34 communicates with conventional indicator means (not shown) and may be adapted to ring a bell, flash a light, regulate or turn off a pump drive, cut down a spinning position, disengage a windup, or the like, whenever the rate of rotation of shaft 25 exceeds a predetermined value.

A number of constant-torque drives (24) are suitable for use in the practice of this invention. It is preferred that such a power source be capable of providing from about 5 to 25 foot-pounds of torque to the melt-pool pump, and that this output not vary more than 5% from the desired value under conditions of constant load. It is further preferred that such torque be available within the range of from about 10 to 100 revolutions per minute, and that the torque-to-speed relationship be substantially linear over this range. These power requirements are easily met without having to resort to unduly large motors, etc., through suitable reduction gearing. Such requirements are sufficient for extruding a wide variety of materials; polymers having a melt viscosity of from about 25 to 60 or more under load conditions can be spun without difficulty using such equipment. Constant-torque output can be supplied by electrical motors supplied for that purpose, by air or fluid motors, or by use of constant-speed devices variably coupled to the load. A Vickers Model 6-3-3 "magneclutch," a magnetic-particle type clutch which transmits constant torque independent of power supply speed has been successfully used in this connection, although it is usually preferred to use the standard D.C. electrical motors supplied for constant-torque applications. All of these items are readily available from commercial suppliers.

The constant-torque power supply drives a positive-displacement melt-pool pump (16). Such pumps are also readily available; their common design features include the very close internal tolerances necessary to avoid any slipping or recirculation of polymer. The output pressure of such pumps should be from about 300 to 2500 p.s.i. at the above-specified power ranges. For the sake of control and standardization, the output pressure should be a reasonably linear function of the torque supplied thereto. To further minimize the likelihood of polymer gellation, degradation, or stagnation, the pump input and outlet ports should be "streamlined," as should the portions of the reservoir and conduits in communication therewith.

By driving the positive-displacement melt-pool pump at a constant predetermined torque, molten polymer is supplied to the meter pump at constant pressure independent of short-range variations in the polymer supply, the melt-pool level, or the bubble content of the molten polymer. When the polymer pressure is sufficiently high, all bubbles are redissolved after passing through the melt-pool pump. An output pressue of about 500 p.s.i. is usually adequate for these purposes. When spinning in this manner, variations in polymer supply at the intake of melt-pool pump are indicated by a change in the steady-state rate of rotation of the melt-pool pump shaft. This change in speed is apparent through observation of a detector, which may be either mechanical, e.g., a tachometer, or electrical, e.g., a generator means. Such changes may also be continuously and automatically monitored by supplying the output signal of the detector to a suitable recording apparatus. The output of the detector may also be used to signal changes in pump speeds as discussed above.

The following non-limiting examples are given to show the improved operations resulting from this invention.

EXAMPLE I

A quantity of poly(hexamethylene adipamide) containing 0.3% titania added as delustrant is spun into 70 denier, 34 filament yarn using the apparatus of FIGURE 1. As a control, similar apparatus using constant-speed spinning as in U.S. 2,278,875 to Graves is employed. The results of a 200 day, 28 position test (each type apparatus) are shown in Table I.

*Table I*

|  | Constant Torque | Constant Speed (Control) |
|---|---|---|
| A. Yarn Performance: |  |  |
| 1. Drawtwist Breaks/Pound | 0.014 | 0.015 |
| 2. Filament Wraps, Percent | 1.4 | 4.8 |
| 3. Defects/MEY | 0.50 | 0.40 |
| B. Unit Removals, Cause: |  |  |
| 1. Loss of Melt | 42 (Detected) | -------- |
| 2. Low Luster | 21 | 80 |
| 3. Off Denier | 16 | 106 |
| 4. Meter Pump Failures | 13 | 156 |
| 5. Miscellaneous | 28 | 107 |
| Total | 120 | 449 |
| Average Unit Life, Days | 37.6 | 11.7 |
| C. Spinning Pack Removals, Cause: |  |  |
| 1. Pack Leaks | 549 | 403 |
| 2. Low Luster | 0 | 87 |
| 3. Removed with Units | 480 | 1,702 |
| 4. Miscellaneous | 717 | 1,415 |
| Total | 1,746 | 3,607 |
| Average Pack Life, Days | 12.0 | 6.0 |

These data show that the quality of the yarn (A) spun at constant-torque is improved with respect to that of the control, even though the spinning packs and spinning units of the former remain operable for much longer time (a two- and three-fold improvement, respectively). Fewer unit and pack removals were required with the constant-torque spinning units. These improvements derive from the use of the positive-displacement pump. Because polymer quality remains consistently high, the accumulation of gel, etc., in the unit and the pack is greatly reduced.

Monitoring the pump shaft speed results in the detection of melt loss in 42 instances, whereas none of these were detected with the control. The occurrence of low-luster yarn and variable denier yarn was greatly reduced in the case of the constant-torque units, whereas these same factors are a cause of over half the unit failures with the control. Variable denier is caused by variations in polymer supply, and their occurrence causes much concern in the textile trade.

EXAMPLE II

The procedure of Example I is repeated to produce 20 denier, 7 filament yarn of poly(hexamethylene adipamide) containing 2% titania as a delustrant. This yarn is spun at 1350 yards per minute. Table II shows the yarn performance and quality data determined after a month's testing over 6 positions.

*Table II*
[Constant Torque Spinning 20-7-680 Yarn]

|  | Constant Torque | Constant Speed (Control) |
|---|---|---|
| A. Yarn Performance: | | |
| 1. Drawtwist Breaks/Pound | 0.052 | 0.053 |
| 2. Filament Wraps, Percent | 0.41 | 0.40 |
| B. Yarn Quality: | | |
| 1. Broken Filament Rej., Percent | 0.34 | 0.50 |
| 2. Defects/MEY | 0.40 | 0.67 |
| 3. Dye Depth | +5.0 | +5.2 |
| 4. Dye Streak | 2.2 | 2.1 |

These results show that constant-torque spinning leads to comparable yarn performance (A) and improved yarn quality (B) over that spun from the control. Average unit and spinning pack lifetime is substantially improved.

In general, corrective action during constant-torque spinning is usually initiated when the rate of rotation of the melt-pool pump shaft exceeds an established "normal" value by more than about 25% or less than about 10%. Higher-than-normal shaft speeds indicate loss of melt, etc., whereas lower-than-normal shaft speeds of lesser magnitude are indicative of binding or stuck melt-pool or meter pumps, a clogged pack, etc., in which case shutting down the spinning position prevents serious damage to such equipment. Before any action is taken, it is worthwhile to determine whether or not the change in shaft speed is merely a temporary or short-range correction, or is a permanent change. In the former case, shaft speed ordinarily will return to normal in about 5 seconds or less. When monitoring is automatic, the relay circuit or speed-responsive means can be adjusted to provide a comparable time lag before discontinuing spinning, etc. The long-range variations in shaft speed, ignoring the above-mentioned temporary changes, can be used to determine the useful life of the spinning unit. A long-range change of about 25% in shaft speed usually indicates that the melting grid should be replaced.

This invention is useful in all spinning or extrusion operations wherein a constant rate of polymer or polymer-solution feed is required. The invention results in a substantial increase in useful life of the spinning unit and the spinning packs, and permits a comparable reduction in the incidence of variable denier yarn. Production or occurrence of such off-standard articles is readily detectable by monitoring shaft speed. In a like manner, many other departures from normal operating are detectable, and the over-all condition of the spinning equipment at any given time can be easily and accurately assessed. The high and constant pressures achievable permit the use of improved spinning packs, reduces or eliminates the pressure drop over the metering pump, and in the case of solutions, eliminates for the most part the need for "resting."

The claimed invention:

1. In apparatus for the melt-spinning of filaments from synthetic organic polymer including spinning means, means for melting the polymer, a reservoir for collecting the molten polymer to form a melt pool and means for pumping the molten polymer under 300 to 2500 pounds per square inch pressure to the spinning means for extruding filaments, the improvement which comprises in combination rotary pumping means for feeding molten polymer from said reservoir to the spinning means in the absence of slipping and recirculation at a constant pressure within said range determined by the rotational drive torque applied to said pumping means and at a rate of feed determined by the drive speed, variable speed constant torque drive means for driving said pumping means, and drive speed detector means for monitoring the speed of said drive means to determine departures from uniform polymer feed to the spinning means.

2. The improvement as defined in claim 1 wherein said drive means is a constant torque electrical motor and said drive speed detector means measures the power input to the motor.

References Cited in the file of this patent

UNITED STATES PATENTS

| 2,278,875 | Graves | Apr. 7, 1942 |
| 2,369,553 | Fields | Feb. 13, 1945 |
| 2,646,017 | Mitchell | July 21, 1953 |
| 2,688,946 | Jarsaillon | Sept. 14, 1954 |
| 2,707,306 | Weber et al. | May 3, 1955 |

OTHER REFERENCES

A.P.C. Application of Rodenacker, S.N. 391,751, April 27, 1943.